United States Patent
Deng

(10) Patent No.: US 9,699,016 B2
(45) Date of Patent: Jul. 4, 2017

(54) SIGN-IN METHOD AND SYSTEM

(71) Applicant: TENCENT TECHNOLOGY (SHENZHEN) COMPANY LIMITED, Shenzhen (CN)

(72) Inventor: Xi Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/710,323

(22) Filed: May 12, 2015

(65) Prior Publication Data

US 2015/0244557 A1 Aug. 27, 2015

Related U.S. Application Data

(63) Continuation of application No. PCT/CN2013/083930, filed on Sep. 22, 2013.

(30) Foreign Application Priority Data

Nov. 14, 2012 (CN) .......................... 2012 1 0457145

(51) Int. Cl.
*H04W 24/00* (2009.01)
*H04L 29/06* (2006.01)
(Continued)

(52) U.S. Cl.
CPC .... *H04L 29/06768* (2013.01); *H04L 63/0815* (2013.01); *H04W 4/02* (2013.01); *H04W 12/06* (2013.01); *H04W 24/00* (2013.01)

(58) Field of Classification Search
CPC ......... H04W 24/00; H04W 4/02; H04W 8/08; H04W 64/00; H04W 12/06; H04L 29/06768; H04L 63/0815
(Continued)

(56) References Cited

U.S. PATENT DOCUMENTS 7,587,067 B1 * 9/2009 Schiller .............. G06K 9/00006
340/573.1
8,549,597 B1 * 10/2013 Strand ................. H04L 63/0407
705/1.1
(Continued)

FOREIGN PATENT DOCUMENTS

CN 101668073 A 3/2010
CN 201536370 U 7/2010
(Continued)

OTHER PUBLICATIONS

International Search Report for International Application No. PCT/CN2013/083930, mailed on Dec. 26, 2013.
(Continued)

*Primary Examiner* — Mong-Thuy Tran
(74) *Attorney, Agent, or Firm* — Knobbe Martens Olson & Bear LLP

(57) ABSTRACT

Disclosed are a sign-in method and system. The method includes: obtaining, by using a location-based service (LBS) of a mobile terminal, geographical information of a current location of a person who signs in; binding the geographical information of the current location with identity information of the person who signs in and time information, using the geographical information of the current location, the identity information of the person who signs in, and the time information as sign-in information, and sending the sign-in information to a sign-in server; verifying, by the sign-in server, the sent sign-in information; and recording the sign-in information if the verification succeeds. The present disclosure not only can save costs of labor, material, and money, but also can enable several people to sign in simultaneously, thereby greatly improving sign-in efficiency.

14 Claims, 2 Drawing Sheets

(51) Int. Cl.
*H04W 4/02* (2009.01)
*H04W 12/06* (2009.01)

(58) Field of Classification Search
USPC .......................... 455/456.1–456.4, 457, 411
See application file for complete search history.

(56) References Cited

U.S. PATENT DOCUMENTS

| | | | | |
|---|---|---|---|---|
| 2003/0070100 | A1* | 4/2003 | Winkler | G06F 21/32 726/26 |
| 2005/0075764 | A1* | 4/2005 | Horst | B60R 25/25 701/19 |
| 2008/0033637 | A1* | 2/2008 | Kuhlman | H04L 63/10 701/533 |
| 2008/0068170 | A1* | 3/2008 | Ehrman | G06Q 10/08 340/572.1 |
| 2008/0226142 | A1* | 9/2008 | Pennella | G06F 21/31 382/124 |
| 2010/0009657 | A1* | 1/2010 | Dingler | H04W 4/02 455/411 |
| 2010/0088747 | A1* | 4/2010 | Fink | H04L 63/102 726/3 |
| 2011/0066468 | A1* | 3/2011 | Huang | G01C 21/3438 705/7.19 |
| 2011/0082768 | A1* | 4/2011 | Eisen | G06Q 30/0609 705/26.35 |
| 2012/0270523 | A1* | 10/2012 | Laudermilch | H04W 48/02 455/411 |
| 2012/0278168 | A1* | 11/2012 | O'Hara | G06Q 30/02 705/14.53 |
| 2013/0066960 | A1* | 3/2013 | Fieremans | H04W 4/001 709/203 |
| 2013/0263240 | A1* | 10/2013 | Moskovitch | G06F 21/32 726/7 |
| 2015/0193543 | A1* | 7/2015 | Poliakov | G06Q 30/02 707/738 |

FOREIGN PATENT DOCUMENTS

| | | |
|---|---|---|
| CN | 102185839 A | 9/2011 |
| CN | 102243739 A | 11/2011 |
| CN | 102572679 A | 7/2012 |
| CN | 102622791 A | 8/2012 |
| CN | 102693563 A | 9/2012 |
| CN | 202425046 U | 9/2012 |
| WO | WO 2012/149448 A1 | 11/2012 |

OTHER PUBLICATIONS

Office Action Issued in Chinese Application No. 2012104571455 dated Nov. 14, 2012 in 7 pages.
International Preliminary Report on Patentability Issued in International Application No. PCT/CN2013/083930 dated May 19, 2015 in 10 pages.

* cited by examiner

SIGN-IN METHOD AND SYSTEM

CROSS-REFERENCE TO RELATED APPLICATIONS

The application is continuation of international application No. PCT/CN2013/083930, filed on Sep. 22, 2013, which claims the benefit of Chinese patent application No. 201210457145.5, filed on Nov. 14, 2012. The disclosures of each of the above applications are hereby incorporated herein by reference in their entireties.

FIELD OF THE TECHNOLOGY

The present disclosure relates to a sign-in technology, and in particular, to a sign-in method and system using a location-based service (LBS).

BACKGROUND OF THE DISCLOSURE

With advancement of society, development of social economy and a fast increasing quantity of activities such as interpersonal communication, dining, shopping, relaxation, handling affairs, studying, and traveling, more people need to strengthen communication between each other; therefore, location information is becoming increasingly important, and sign-in is a common means of obtaining location information.

Currently, sign-in at a fixed site generally may be performed in the following manners:

(1) a person signs in by writing on paper, where confirmation is performed by means of handwriting;

(2) a person signs in by clocking in, which associates a card with an identity of the person who signs in;

(3) a person signs in by using a bar code, which associates the bar code with an identity of the person who signs in;

(4) a person signs in by using a touch screen, which associates fingerprint image recognition with an identity of the person who signs in; and (5) a person signs in by using an identity card, which associates identity card image recognition with an identity of the person who signs in.

However, in all of the above sign-in manners, a dedicated sign-in device (such as an electronic time recorder and a fingerprint recognizing device) needs to be arranged at each fixed site, or sign-in management is performed by a special person, which not only needs to consume a lot of labor, material, and money, but also has relatively low efficiency because sign-in must be performed successively.

SUMMARY

In view of this, the present disclosure provides a sign-in method and system, so as to solve a problem that current sign-in manners have high costs of labor, material, and money and have low efficiency.

The present disclosure provides a sign-in method, including:

obtaining, by using an LBS of a mobile terminal, geographical information of a current location of a person who signs in;

binding the geographical information of the current location with identity information of the person who signs in and time information, using the geographical information of the current location, the identity information of the person who signs in, and the time information as sign-in information, and sending the sign-in information to a sign-in server;

verifying, by the sign-in server, the sent sign-in information; and recording the sign-in information if the verification succeeds.

The present disclosure further provides a sign-in system, which includes:

a mobile location server, configured to provide an LBS by using a network;

one or more mobile terminals, configured to store identity information of a person who signs in, obtain, from the mobile location server, geographical information of a current location of the person who signs in, bind the geographical information of the current location with the identity information of the person who signs in and time information, use the geographical information of the current location, the identity information of the person who signs in, and the time information as sign-in information, and send the sign-in information; and a sign-in server, configured to receive the sign-in information sent by the mobile terminals, verify the sign-in information, and record the sign-in information after the verification succeeds.

Relative to the prior art, beneficial effects of the present disclosure are that: in the present disclosure, an LBS service of a mobile terminal is used, so that sign-in information can be managed together, and a sign-in device or managerial staff does not need to be arranged at each sign-in spot, which not only can save costs of labor, material, and money, but also can enable several people to sign in simultaneously, thereby greatly improving sign-in efficiency.

The above description is merely a summary of the technical solutions of the present disclosure, and to understand the technical means of the present disclosure more clearly, implementation may be performed according to content of the specification. In addition, to make the above objectives or other objectives, features and advantages of the present disclosure more comprehensive, the following gives a detailed description by using preferred embodiments as an example and with reference to the accompanying drawings.

DESCRIPTION OF EMBODIMENTS

To further explain the technical means used in the present disclosure for achieving the intended objectives and the effects thereof, specific implementation manners, methods, steps, and effects of a sign-in method and system provided by the present disclosure are described in detail below with reference to the accompanying drawings and preferred embodiments.

The existing technology and content, features and effects of other technical content of the present disclosure are shown clearly in the following detailed descriptions of the preferred embodiments combined with the reference drawings. Through description of specific implementation manners, the technical means used in the present disclosure for achieving the intended objectives and effects thereof can be understood more deeply and specifically, however, the accompanying drawings are merely used for providing reference and description, and are not intended to limit the present disclosure.

Figure 1:
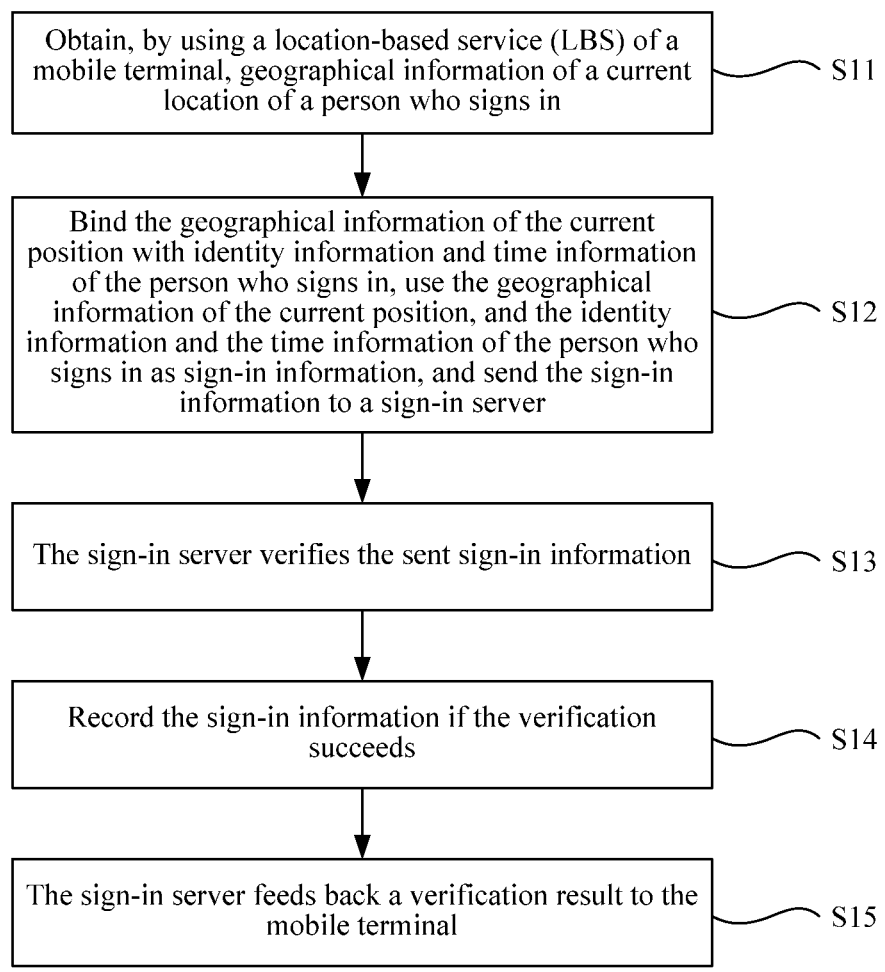
FIG. 1 is a flowchart of a sign-in method according to an embodiment of the present invention.

Refer to FIG. 1, which is a flowchart of a sign-in method according to an embodiment of the present invention, which includes the following steps:

S11: Obtain, by using an LBS of a mobile terminal, geographical information of a current location of a person who signs in.

The mobile terminal is held or carried by the person who signs in, and may be a mobile phone, a tablet computer, or the like. In the LBS, location information of the mobile terminal, such as the geographical information of the current location, is obtained by using a wireless communication network (such as a Global System for Mobile Communication (GSM) network, or a Code Division Multiple Access (CDMA) network) of the telecom operator or an external positioning manner (such as Global Positioning System (GPS)). Because the mobile terminal is held or carried by the person who signs in, the location information of the mobile terminal is location information of the person who signs in. Therefore, an LBS application program is necessarily installed on the mobile terminal in the present disclosure, so as to obtain the geographical information of the current location of the person who signs in.

During specific operation, the LBS application program of the mobile terminal is logged in to first, and a request for obtaining the location information is sent to an LBS mobile location server; after receiving the request, the mobile location server obtains the geographical information of the current location of the mobile terminal (that is, the geographical information of the current location of the person who signs in) by positioning the mobile terminal, and returns the geographical information of the current location of the mobile terminal to the mobile terminal. The mobile location server in the present disclosure obtains, preferably in a GPS positioning manner, the geographical information of the current location of the person who signs in.

S12: Bind the geographical information of the current location with identity information of the person who signs in and time information, use the geographical information of the current location, the identity information of the person who signs in, and the time information as sign-in information, and send the sign-in information to a sign-in server.

The geographical information received by the mobile terminal may be map information or latitude and longitude information (such as latitude and longitude information of the current location of the person who signs in) or the like; and for facilitating calculation, the latitude and longitude information composed only by numbers is a preferred selection of the present disclosure, where the latitude and longitude information may also be acquired by parsing the map information.

The identity information of the person who signs in may be stored (such as pre-stored) in the mobile terminal, and may be a name, a serial number and the like of the person who signs in, or may also be a serial number and the like of the mobile terminal.

The time information refers to a time when the person signs in, and may be obtained directly from the mobile terminal, or may also be obtained from the mobile location server or the sign-in server.

S13: The sign-in server verifies the sent sign-in information.

The sign-in server is a device which manages the sign-in information together, and may manage one sign-in spot, or may also manage multiple sign-in spots simultaneously.

The sign-in information needed by each sign-in spot may be pre-stored in the sign-in server, where the sign-in information includes geographical information of the sign-in spot, identity information of a person who signs in, and sign-in time information. Therefore, after receiving the sign-in information sent by the mobile terminal, the sign-in server parses the sign-in information to obtain the geographical information, the identity information, and the time information, and compares the geographical information, the identity information, and the time information with corresponding data pre-stored locally; if a comparison result is consistent (that is, the verification succeeds), it indicates that the sign-in succeeds, and if a comparison result is inconsistent (that is, the verification fails), it indicates that the sign-in fails. That is, the step of verifying, by the sign-in server, the sent sign-in information includes: performing, by the sign-in server, verification by comparing the geographical information, the identity information of the person who signs in, and the time information in the sign-in information with the geographical information, the identity information of the person who signs in, and the sign-in time information that correspond to the sign-in spot and are locally pre-stored.

S14: Record the sign-in information if the verification succeeds.

After the verification succeeds, sign-in information of successful sign-in needs to be recorded, so as to help searching and viewing.

S15: The sign-in server feeds back a verification result to the mobile terminal, so as to tell the person who signs in whether the person signs in successfully. That is, after completing verifying the sign-in information, the sign-in server sends the mobile terminal a message indicating that "the sign-in succeeds" or "the sign-in fails" (that is, a verification result or a sign-in result).

Figure 2:
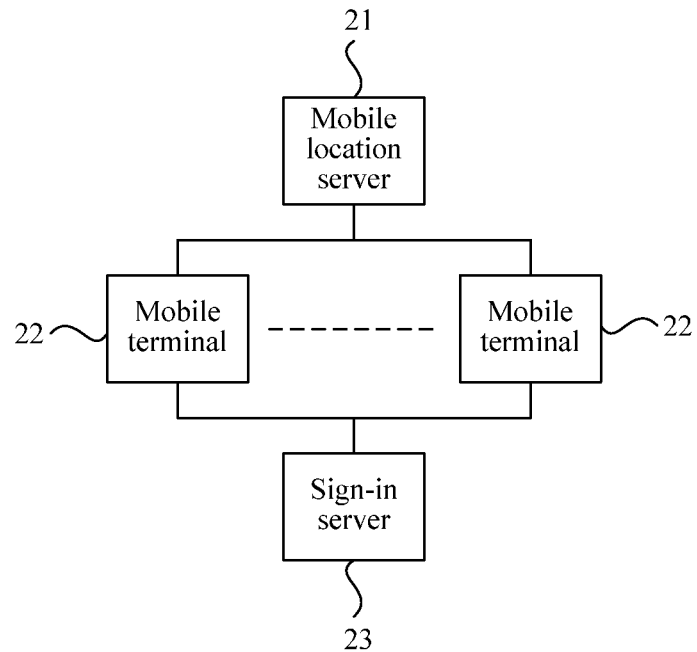
FIG. 2 is a structural diagram of a sign-in system according to an embodiment of the present invention.

The present disclosure further provides a sign-in system. Referring to FIG. 2, the system includes a mobile location server 21, one or more mobile terminals 22, and a sign-in server 23. All the mobile terminals 22 can be connected to the mobile location server 21 and the sign-in server 23.

The mobile terminals 22 are held or carried by people who sign in. After a person who signs in arrives at a spot, the person sends, to the mobile location server 21 by using the held or carried mobile terminal 22, a request for obtaining geographical information of a current location of the person who signs in. After receiving the request, the mobile location server 21 positions the mobile terminal 22 by using an LBS, so as to obtain geographical information thereof, and returns the geographical information to the corresponding mobile terminal 22. In this way, the mobile terminal 22 obtains, from the mobile location server 21, the geographical information of the current location of the person who signs in. Preferably, the geographical information is latitude and longitude information composed by numbers, so as to facilitate calculation and transmission (certainly, the geographical information may be geographical information in other forms, such as map information).

After receiving the geographical information of the current location, if the geographical information is not information in a number form (such as map information), the mobile terminal 22 first parses the geographical information of the current location to obtain geographical information in a number form (such as latitude and longitude information); if the geographical information is in a number form, the mobile terminal 22 binds the geographical information with current time information and identity information, which is locally pre-stored, of the person who signs in, uses the geographical information, the current time information, and the identity information as sign-in information, and sends the sign-in information to the sign-in server 23. As described above, the current time information may be obtained locally from the mobile terminal, or may also be obtained from the mobile location server or the sign-in server.

After receiving the sign-in information sent by the mobile terminal 22, the sign-in server 23 verifies the sign-in information, records sign-in information passing the verification, and returns a sign-in result (that is, a verification result) to the mobile terminal 22.

Figure 3:
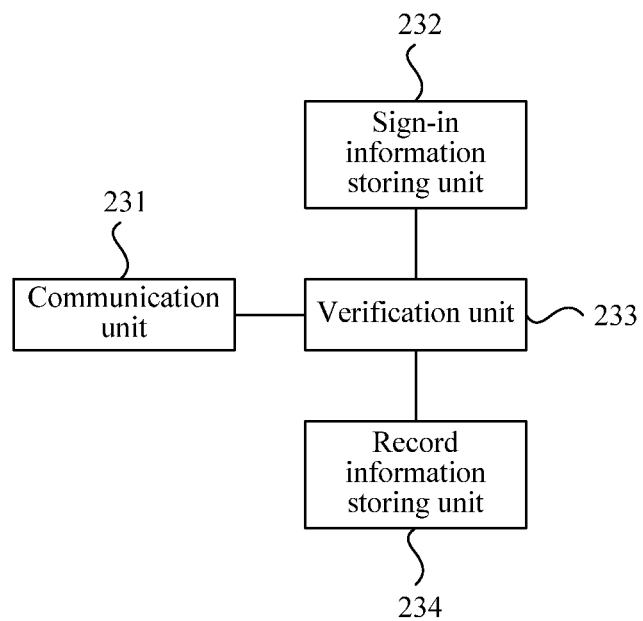
FIG. 3 is a structural diagram of a sign-in server according to an embodiment of the present invention.

The sign-in server 23 further includes a communication unit 231, a sign-in information storing unit 232, a verification unit 233, and a record information storing unit 234. Referring to FIG. 3, the verification unit 233 is connected to the communication unit 231, the sign-in information storing unit 232, and the record information storing unit 234. The communication unit 231 is configured to receive and send data, for example, receive data from the mobile terminal 22, and send data to the mobile terminal 22. The sign-in information storing unit 232 is configured to store (such as pre-store) geographical information of each sign-in spot, and identity information of a corresponding person who signs in and sign-in time information that correspond to each sign-in spot. The verification unit 233 is configured to perform verification by comparing the sign-in information sent by the mobile terminal 22 with geographical information, identity information of the person who signs in, and time information that correspond to the sign-in spot and are pre-stored in the sign-in information storing unit 232. The record information storing unit 234 is configured to store sign-in information passing the verification.

When receiving the sign-in information sent by the mobile terminal 22, the communication unit 231 transmits the sign-in information to the verification unit 233. The verification unit 233 verifies the received sign-in information, and specifically, the verification unit 233 parses the sign-in information to obtain the identity information of the person who signs in, the geographical information of the current location, and the time information, and compares the information with the corresponding information pre-stored in the sign-in information storing unit 232. The corresponding information pre-stored in the sign-in information storing unit 232 includes the geographical information of each sign-in spot, and the identity information of the person who signs in and the sign-in time information that correspond to each sign-in spot. When performing verification specifically, the verification unit 233 may first traverse data in the sign-in information storing unit 232 based on the geographical information, in the sign-in information, of the person who signs in, so as to find a corresponding sign-in spot, or to find a sign-in spot within a certain range (by using a current LBS technology, the location of the person who signs in may be obtained through positioning with deviation less than 10 meters, and therefore, a verification error rate can be effectively reduced by using the sign-in spot within the certain range around the location of the person who signs in as a verification target); then, the verification unit 233 performs verification by traversing the identity information of the person who signs in that corresponds to the found sign-in spot; and finally, the verification unit 233 verifies whether the corresponding time information is consistent with the pre-stored time information or is within an allowed range. If the verification succeeds, the verification unit 233 stores sign-in information of successful sign-in into the record information storing unit 234, so as to help searching and viewing, and returns, to the corresponding mobile terminal 22 by using the communication unit 231, a message indicating that the sign-in succeeds. If the verification fails, the verification unit 233 directly returns, to the corresponding module terminal 22 by using the communication unit 231, a message indicating that the sign-in fails.

In the present disclosure, an LBS service of a mobile terminal is used, so that sign-in information can be managed together, and a sign-in device or managerial staff does not need to be arranged at each sign-in spot, which not only can save costs of labor, material, and money, but also can enable several people to sign in simultaneously, thereby greatly improving sign-in efficiency.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-described technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A sign-in method, comprising:
   storing, by a sign-in server, sign-in information of an activity which requires sign-in of at least one pre-determined attendee at a pre-determined geographical sign-in spot, the sign-in information of the activity comprises geographical information of the sign-in spot, identity information of the at least one attendee, and sign-in time information of the sign-in spot;
   receiving, by the sign-in server from a mobile terminal, sign-in information of a person who signs in, the sign-in information received comprises geographical information of a current location of the person who signs in, identity information of the person who signs in and a time when the person signs in;
   verifying, by the sign-in server, the sign-in information received; and
   recording the sign-in information if the verification succeeds;
   wherein verifying by the sign-in server the sign-in information received comprises:
      comparing, by the sign-in server, the geographical information, the identity information, and the time in the sign-in information received respectively with the geographical information, the identity information, and the sign-in time information in the sign-in information of the activity stored in the sign-in server; and
      determining whether the person is one of the at least one attendee of the activity and whether the current location and the time when the person signs in are consistent with the geographical information of the sign-in spot and the sign-in time information of the sign-in spot.

2. The sign-in method according to claim 1, after the step of verifying, by the sign-in server, the sent sign-in information, further comprising: feeding back, by the sign-in server, a verification result to the mobile terminal.

3. The sign-in method according to claim 1, wherein the geographical information of the current location of the person who signs in is obtained in a Global Positioning System (GPS) positioning manner.

4. The sign-in method according to claim 1, wherein the geographical information is latitude and longitude information of the current location of the person who signs in.

5. The sign-in method according to claim 1, further comprising:
making, by the sign-in server, a determination that the verification succeeds if the received sign-in information is consistent with the sign-in information of the activity pre-stored in the sign-in information storing unit.

6. The sign-in method according to claim 5, wherein comparing by the sign-in server the geographical information, the identity information, and the time in the sign-in information received respectively with the geographical information, the identity information, and the sign-in time information in the sign-in information of the activity stored in the sign-in server comprises:
searching in sign-in information of activities pre-stored in the sign-in server for an activity whose sign-in spot is within a pre-determined range around the current location of the person specified by the geographical information in the received sign-in information;
if an activity is found,
searching in sign-in information of the found activity for identity information which is consistent with the identity information in the received sign-in information;
if identity information consistent with the identity information in the received sign-in information is found in the sign-in information of the found activity,
verifying whether the time in the received sign-in information is within a pre-determined range around a time specified by sign-in time information in the sign-in information of the found activity; and making the determination that the verification succeeds if the time is within the pre-determined range.

7. A sign-in system, comprising:
a mobile location server, configured to provide a location-based service (LBS) by using a network;
one or more mobile terminals, configured to store identity information of a person who signs in, obtain, from the mobile location server, geographical information of a current location of the person who signs in, bind the geographical information of the current location with the identity information of the person who signs in and time information, use the geographical information of the current location, the identity information of the person who signs in, and a time when the person signs in as sign-in information, and send the sign-in information; and
a sign-in server, configured to store sign-in information of an activity which requires sign-in of at least one pre-determined attendee at a pre-determined geographical sign-in spot, the sign-in information of the activity comprises geographical information of the sign-in spot, identity information of the at least one attendee, and sign-in time information of the sign-in spot; receive the sign-in information sent by the mobile terminals; verify the sign-in information comprising comparing the geographical information, the identity information, and the time in the sign-in information received respectively with the geographical information, the identity information, and the sign-in time information in the sign-in information of the activity stored in the sign-in server, and determining whether the person is one of the at least one attendee of the activity and whether the current location and the time when the person signs in are consistent with the geographical information of the sign-in spot and the sign-in time information of the sign-in spot; and record the sign-in information after the verification succeeds.

8. The sign-in system according to claim 7, wherein after completing the verification, the sign-in server feeds back a verification result to the mobile terminals.

9. The sign-in system according to claim 7, wherein the sign-in server comprises:
a communication unit, configured to receive and send data;
a sign-in information storing unit, configured to pre-store geographical information of each sign-in spot of each activity, and identity information of at least one attendee of each activity and sign-in time information that correspond to each sign-in spot;
the sign-in information of the activity pre-stored in the sign-in information storing unit; and
a record information storing unit, configured to store sign-in information passing the verification.

10. The sign-in system according to claim 7, wherein the mobile location server obtains, in a Global Positioning System (GPS) positioning manner, the geographical information of the current location of the person who signs in.

11. The sign-in system according to claim 7, wherein the geographical information is latitude and longitude information of the current location of the person who signs in.

12. A sign-in server, comprising:
a sign-in information storing unit, configured to pre-store sign-in information of an activity which requires sign-in of at least one pre-determined attendee at a pre-determined geographical sign-in spot, the sign-in information of the activity comprises geographical information of the sign-in spot, identity information of the at least one attendee, and sign-in time information of the sign-in spot;
a communication unit, configured to receive from a mobile terminal sign-in information of a person who signs in, the sign-in information received comprises geographical information of a current location of the person who signs in, identity information of the person who signs in and a time when the person signs in;
a verification unit, configured to verify sign-in information received, wherein verifying comprises comparing the geographical information, the identity information, and the time in the sign-in information received respectively with the geographical information, the identity information, and the sign-in time information in the sign-in information of the activity pre-stored in the sign-in information storing unit, and determining whether the person is one of the at least one attendee of the activity and whether the current location and the time when the person signs in are consistent with the geographical information of the sign-in spot and the sign-in time information of the sign-in spot; and
a record information storing unit, configured to store the sign-in information received if the verification succeeds.

13. The sign-in server according to claim 12, wherein the verification unit is configured to make a determination that the received sign-in information passes verification if the received sign-in information is consistent with the sign-in information of the activity pre-stored in the sign-in information storing unit.

14. The sign-in server according to claim 13, wherein
the verification unit is configured to search in sign-in
information of activities pre-stored in the sign-in information storing unit for an activity whose sign-in spot is within a pre-determined range around the current location of the person who signs in in the received sign-in information; if an activity is found, search in sign-in information of the activity found for identity information which is consistent with the identity information in the received sign-in information; if the identity information in the sign-in information of the activity found is consistent with the identity information in the received sign-in information, verify whether the time in the received sign-in information is within a pre-determined range around a time specified by sign-in time information in the sign-in information of the activity found; and making a determination the received sign-in information passes verification if the time is within the pre-determined range.

* * * * *